(12) United States Patent
Poorbaugh et al.

(10) Patent No.: US 11,577,913 B2
(45) Date of Patent: Feb. 14, 2023

(54) SYSTEMS AND METHODS FOR MOVING OBJECTS ALONG A PREDETERMINED PATH

(71) Applicant: Brown International Corporation, LLC, Winter Haven, FL (US)

(72) Inventors: Mike Poorbaugh, Lakeland, FL (US); Tony Tedesco, Lakeland, FL (US); Terrence A. Pagano, Rio Verde, AZ (US)

(73) Assignee: Brown International Corporation, LLC, Winter Haven, FL (US)

( * ) Notice: Subject to any disclaimer, the term of this patent is extended or adjusted under 35 U.S.C. 154(b) by 79 days.

(21) Appl. No.: 17/195,731

(22) Filed: Mar. 9, 2021

(65) Prior Publication Data

US 2021/0284454 A1 Sep. 16, 2021

Related U.S. Application Data

(60) Provisional application No. 62/988,530, filed on Mar. 12, 2020.

(51) Int. Cl.
*B65G 17/26* (2006.01)
*B65G 17/12* (2006.01)
(Continued)

(52) U.S. Cl.
CPC ............. *B65G 17/26* (2013.01); *A23N 1/003* (2013.01); *A23N 1/02* (2013.01); *B65G 17/12* (2013.01);
(Continued)

(58) Field of Classification Search
CPC ........ B65G 17/26; B65G 17/12; B65G 17/36; B65G 17/42; B65G 2201/0211;
(Continued)

(56) References Cited

U.S. PATENT DOCUMENTS 2,631,625 A 3/1953 Wells
2,969,867 A * 1/1961 McClelland ............. A23N 4/04
414/757

(Continued)

FOREIGN PATENT DOCUMENTS

CN 106466786 A * 3/2017 ......... B23Q 3/15724
EP 0319706 A2 6/1989

OTHER PUBLICATIONS

International Search Report & Written Opinion of the International Searching Authority; PCT Application PCT/US2021/021812; dated May 21, 2021.

*Primary Examiner* — Mark A Deuble
(74) *Attorney, Agent, or Firm* — Jones Day

(57) ABSTRACT

Systems and methods are provided for an apparatus for moving objects along a predetermined path. A system includes plurality of conveying units, each conveying unit being connected to two other conveying units. A particular conveying unit includes a first link unit configured for connection to a first neighbor conveying unit. A second link unit is configured for connection to the first link unit, the second link unit further being configured for connection to a first link unit of a second neighbor conveying unit. A cup is detachably connected to the second link unit.

20 Claims, 8 Drawing Sheets

(51) Int. Cl.
*B65G 17/36* (2006.01)
*A23N 1/02* (2006.01)
*A23N 1/00* (2006.01)
*B65G 17/42* (2006.01)

(52) U.S. Cl.
CPC ............ *B65G 17/36* (2013.01); *B65G 17/42* (2013.01); *B65G 2201/0211* (2013.01); *B65G 2207/12* (2013.01)

(58) Field of Classification Search
CPC ............ B65G 2207/12; B65G 2207/30; A23N 1/003; A23N 1/02
USPC ............................................. 198/626.1–626.6
See application file for complete search history.

(56) References Cited

U.S. PATENT DOCUMENTS

| | | | |
|---|---|---|---|
| 3,150,700 A * | 9/1964 | Stansbary | A23N 1/003 83/409.1 |
| 3,796,297 A | 3/1974 | Holbrook | |
| 3,952,860 A | 4/1976 | Specht | |
| 4,957,619 A * | 9/1990 | Powell, Jr. | B07C 5/18 209/912 |
| 5,429,227 A | 7/1995 | Krossmann et al. | |
| 8,714,365 B2 * | 5/2014 | Morley | B65G 23/06 209/617 |
| 8,746,435 B2 * | 6/2014 | Nijland | B07C 5/18 198/370.09 |
| 8,973,732 B2 * | 3/2015 | Crescenzo | A23N 3/04 198/384 |
| 2019/0152710 A1 * | 5/2019 | Reed | B65G 23/06 |

\* cited by examiner

SYSTEMS AND METHODS FOR MOVING OBJECTS ALONG A PREDETERMINED PATH

CROSS REFERENCE TO RELATED APPLICATIONS

This application claims priority to U.S. Provisional Application No. 62/988,530 filed Mar. 12, 2020, the entirety of which is herein incorporated by reference.

BACKGROUND

Conveyer systems are often used to move objects along a path that facilitates performing a process on those objects. Where objects are flat, a conveyer belt may be used. But where objects are not flat, more specialized apparatuses may be used to facilitate transport of objects through the process.

DETAILED DESCRIPTION

Figure 1:
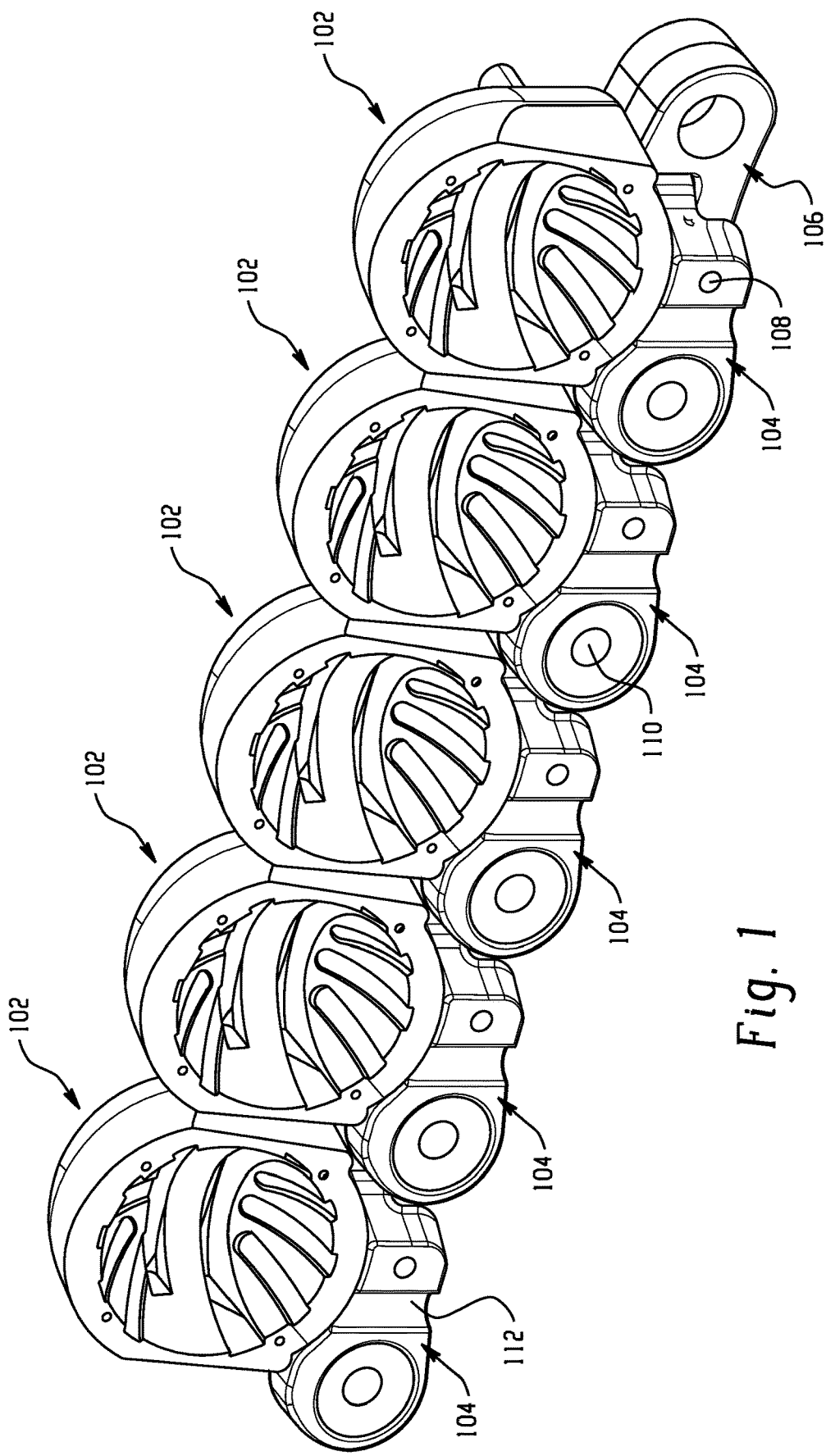
FIG. 1 is a diagram depicting an array of cups for moving objects along a predetermined path.

FIG. 1 is a diagram depicting an array of cups for moving objects along a predetermined path. The example of FIG. 1 includes a series of cups 102 positioned side by side, generally oriented in a common (similar) direction. The cups 102 may be formed from a variety of materials, such as a rubber material that is rigid enough to convey (move or carry) an object being moved or carried in (by) the cup, but flexible enough to be resistant to damage when coming into contact with structures, such as other cups 102 or structures for moving the cups along a predetermined path (e.g., links of a chain). In other examples, the cups 102 may be formed of a more rigid material such as hardened plastic. In other examples, the cups 102 may be formed by multiple pieces, such as a flexible rubber exterior portion supported by a more rigid (e.g., hard plastic, metal) material onto which the rubber exterior portion is formed or placed. The cups may hold an object from the bottom of the object, from the side, or substantially from the side (e.g., with a small (e.g., 5 degree, 10 degree) tilt from vertical.

The cups 102 are moved along a predetermined path by a structure made up of a plurality of serially connected conveying units. In the example of FIG. 1, the structure is a series of chain links, where two link units work together as a pair to hold one cup in position as a conveying unit, with conveying units being serially connected to one another to form a chain (e.g., a circuit as described further herein) of conveying units. In the visualization of FIG. 1, a first link unit 104 of each conveying units is visible, and one second link unit 106 of a right most conveying unit is visible. As discussed further and illustrated in FIG. 3, a first link unit 104 is connected to a second link unit by positioning the first link unit 104 onto a post structure of the second link unit 106, with a retaining ring 108 securing the first link unit 104 to the second link unit 106. In embodiments, the pin further secures the cup 102 to its conveying unit made up of a first link unit 104 and a second link unit 106. Neighboring conveying units are connected to one another via a bushing 110 that is positioned through a first link unit of a first conveying unit and a second link unit of a neighbor conveying unit. In the example of FIG. 1, the first link unit 104 further includes a connection structure 112 (e.g., an articulating slot, a notch) for receiving an external pin that is configured to impart motion of the conveying units along the predetermined path.

In embodiments, the cups 102 can be installed and removed without disassembling conveying units or disconnecting conveying units from their neighbors. In embodiments, the cups can be installed/removed with limited or no tools. In embodiments, link units of a conveying unit can be connected and disconnected with limited or no tools, and conveying units can be connected/disconnected from neighboring conveying units with limited or no tools.

Figure 2:
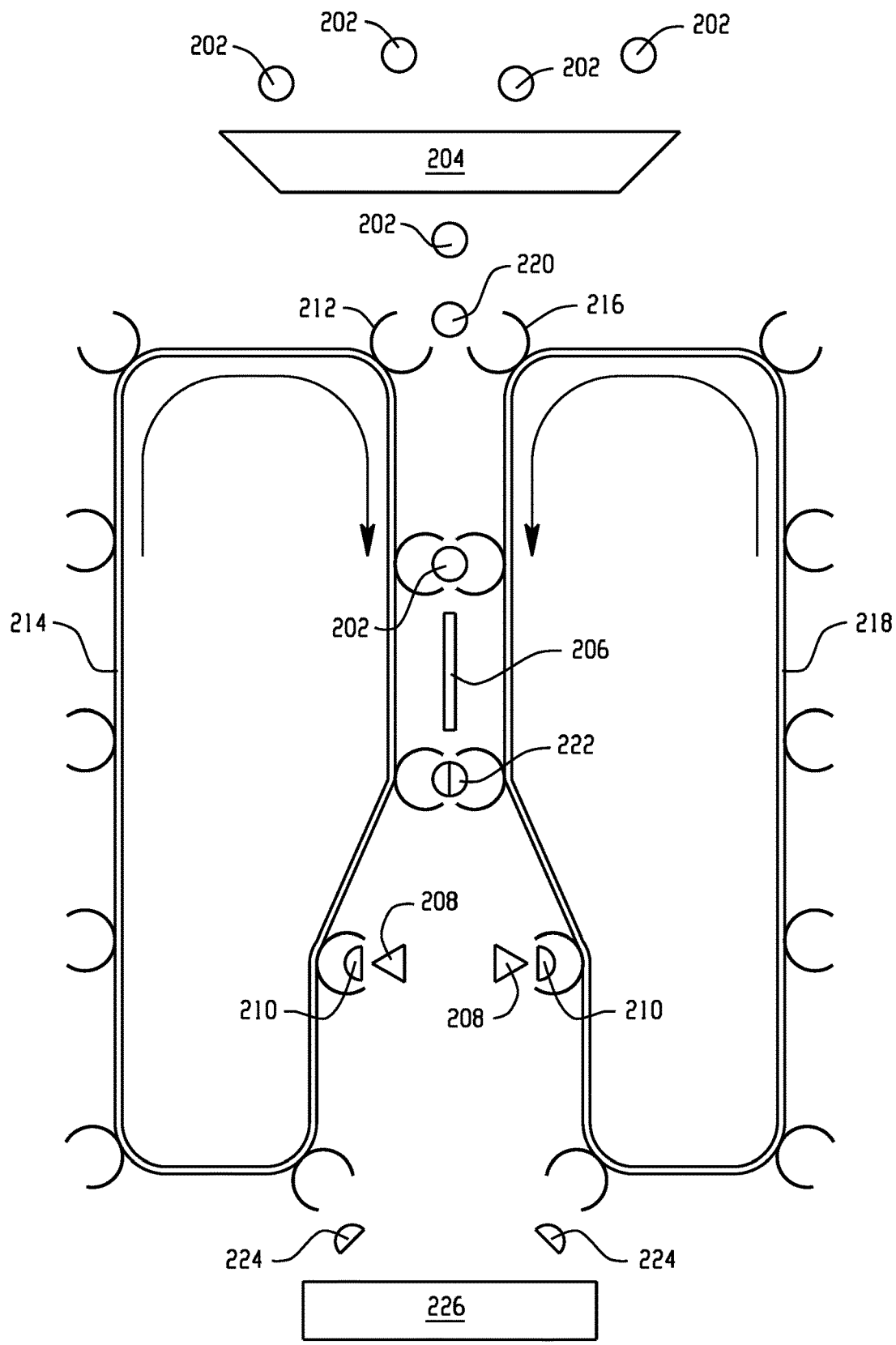
FIG. 2 is a diagram depicting two circuits of conveying units conveying fruit from a collection area to a cutting station for cutting the fruit in half and thereafter to juicing stations for juicing the respective halves of the cut fruit.

FIG. 2 is a diagram depicting two circuits of conveying units conveying fruit 202 (e.g., citrus fruit, such as oranges, grapefruit, lemons, limes, citron, tangerines) from a collection area 204 to a cutting station 206 for cutting the fruit in half and thereafter to juicing stations 208 for juicing the respective halves 210 of the cut fruit. Initially, a first cup 212 of the first (left) circuit 214 and a first cup 216 of the second (right) circuit 218 are configured to simultaneously, cooperatively hold a piece of fruit 220 dropped from a collection area. The two first cups move the piece of fruit across a cutting station blade 206 to cut the fruit into two halves as shown at 222. Each of the first cups then transits its respective half of the cut fruit to a juicing station 208 (e.g., a substantially conical structure onto which a fruit half 210 is compressed) where juice is extracted (e.g., via squeezing or reaming) and collected. Following juicing, the first cups may drop the juiced fruit halves 224 into a bin 226 for disposal or further processing. The first cups then transit the remainder of their respective circuits to the collection area 204 where they again cooperatively collect and move a new piece of fruit (e.g., the same two first cups together or with a different cup of the opposing circuit where the two circuits have differing numbers of conveying units).

Figure 3:
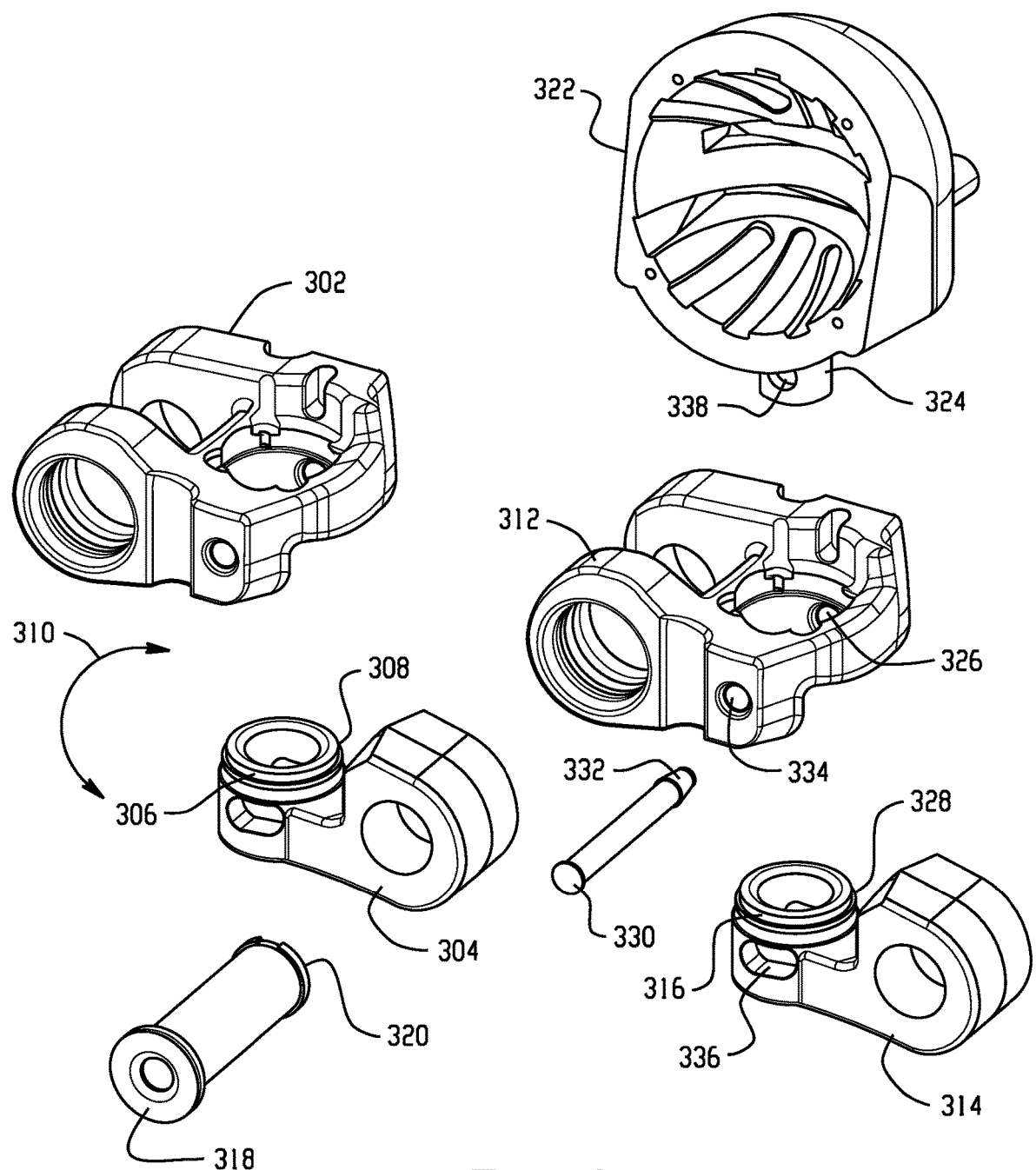
FIG. 3 depicts components of conveying units.

FIG. 3 depicts components of conveying units. A first conveying unit includes a first link unit 302 and a second link unit 304. The second link unit 304 includes a retaining ring 306 that can be compressed (e.g., using retaining ring pliers). As depicted in detail in FIG. 4, the first link unit 302 is connected to the second link unit 304 by positioning the first link unit 302 on a post structure 308 of the second link unit, compressing the retaining ring 306 during positioning of the first link unit 302 with expansion of the retaining ring 306 after positioning to secure the link units 302, 304 together. The first link unit 302 and the second link unit 304 are connected such that the first link unit 302 is configured to pivot on the post structure 308 as depicted at 310.

FIG. 3 further includes a second conveying unit that includes a first link unit 312 and a second link unit 314. Those link units 312, 314 are connected to one another in a similar fashion as link units 302, 304 via a retaining ring 316. The second link unit 304 of the first conveying unit is connected to the first link unit 312 of neighboring second conveying unit via a bushing 318. The bushing 318 includes a bushing retaining ring 320 that compresses during installation through link units 304, 312 and expands following installation to secure those link units 304, 320 to one another. A tool (e.g., a multi jaw tool, a collet) may be used to compress the bushing retaining ring 312 until its outer diameter is reduced sufficiently to pass through the connected link units 304, 312 for disassembly.

FIG. 3 also depicts a cup. The cup includes a rubber portion 322 that is connected to a rigid neck structure 324. The neck structure 324 is positioned within a hole 326 of the first link unit 312 and the post structure 328 of the second link unit 314 on which that first link unit 312 is positioned. The cup structure is secured to the first link unit 312 and the second link unit 314 via a pin 330. The pin 330 includes a compressible pin tip 332 (e.g., a rubber, mushroom shaped structure that can be compressed to fit through holes). In embodiments, the pin tip 332 is screwed onto the pin 330. The pin tip 332 is compressed and threaded or pushed through a first link unit hole 334, a second link unit hole 336, a neck structure hole 338 and back side structures of those holes. Upon exiting the back side hole of the first link unit 312, the pin tip 332 expands to secure the components. In embodiments, a tube shaped tool is used to compress the pin tip structure 332, with the pin being pulled out through the holes 334, 336, 338 to release the cup structure from its first link unit 312 and second link unit 314.

In embodiments, the retaining rings 306, 320 and pin tip 332 remain connected to their respective base structures during installation and deinstallation of components (e.g., connecting a first link unit to a second link unit, connecting a first conveying unit to a neighbor conveying unit, connecting a cup structure to its respective first link unit and second link unit supporting structure). In sensitive installations, such as those where food products are being serviced by the apparatus (e.g., a juice extractor), the retention of components 320, 332, 306 during installation and deinstallation of components (e.g., removing a damaged cup structure 322, 324 and replacing that cup structure with a new cup structure without disassembling any link units or neighboring conveying units) can prevent loss of those components into the sensitive product. Loss of such a component 306, 320, 332 into an apparatus could result in needing to discard sensitive product (e.g., juice, pulp, citrus oils) or disassembly of the apparatus to ensure that the missing component is not shipped in finished product (e.g., and consumed) or damages the apparatus.

Figure 4:
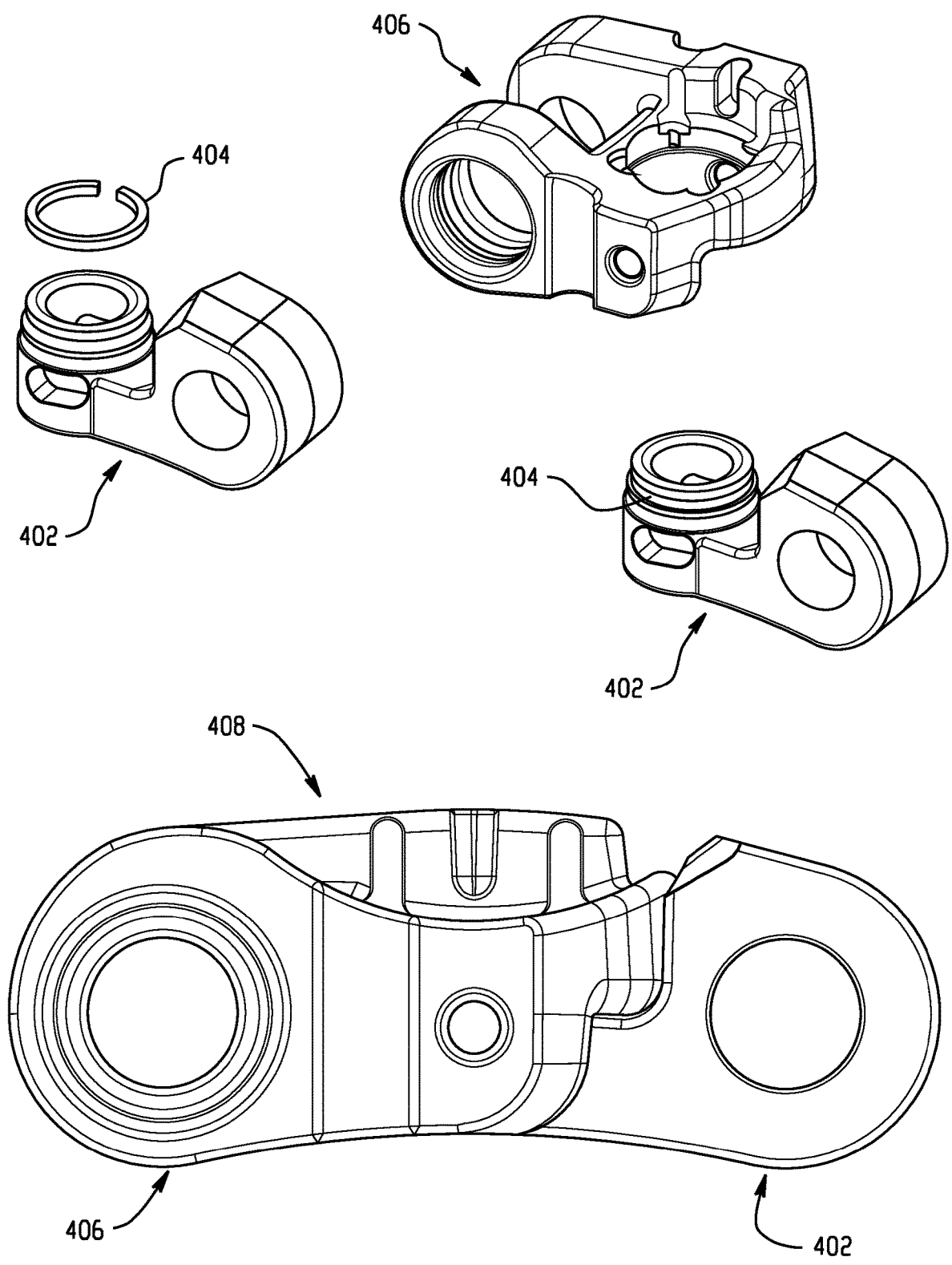
FIG. 4 is a diagram depicting installation of a first link unit and a second link unit of a particular conveying unit via a compressible retaining ring.

FIG. 4 is a diagram depicting installation of a first link unit and a second link unit of a particular conveying unit. A second link unit 402 has a retaining ring 404 installed onto its post structure in a groove. In embodiments, the retaining ring 404 typically remains installed on the second link unit 402, absent failure or deterioration of the retaining ring 404, through the remainder of the useful life of the second link unit 402. A first link unit 406 is positioned on the post structure of the second link unit 402, wherein the retaining ring 404 is compressed during positioning of the first link unit 406, and wherein the retaining ring 404 expands after positioning of the first link unit 406. The connected second link unit 402 and first link unit 406 is depicted at 408. In embodiments, the first link unit 406 is configured to pivot on the post structure of the second link unit 402.

Figure 5:
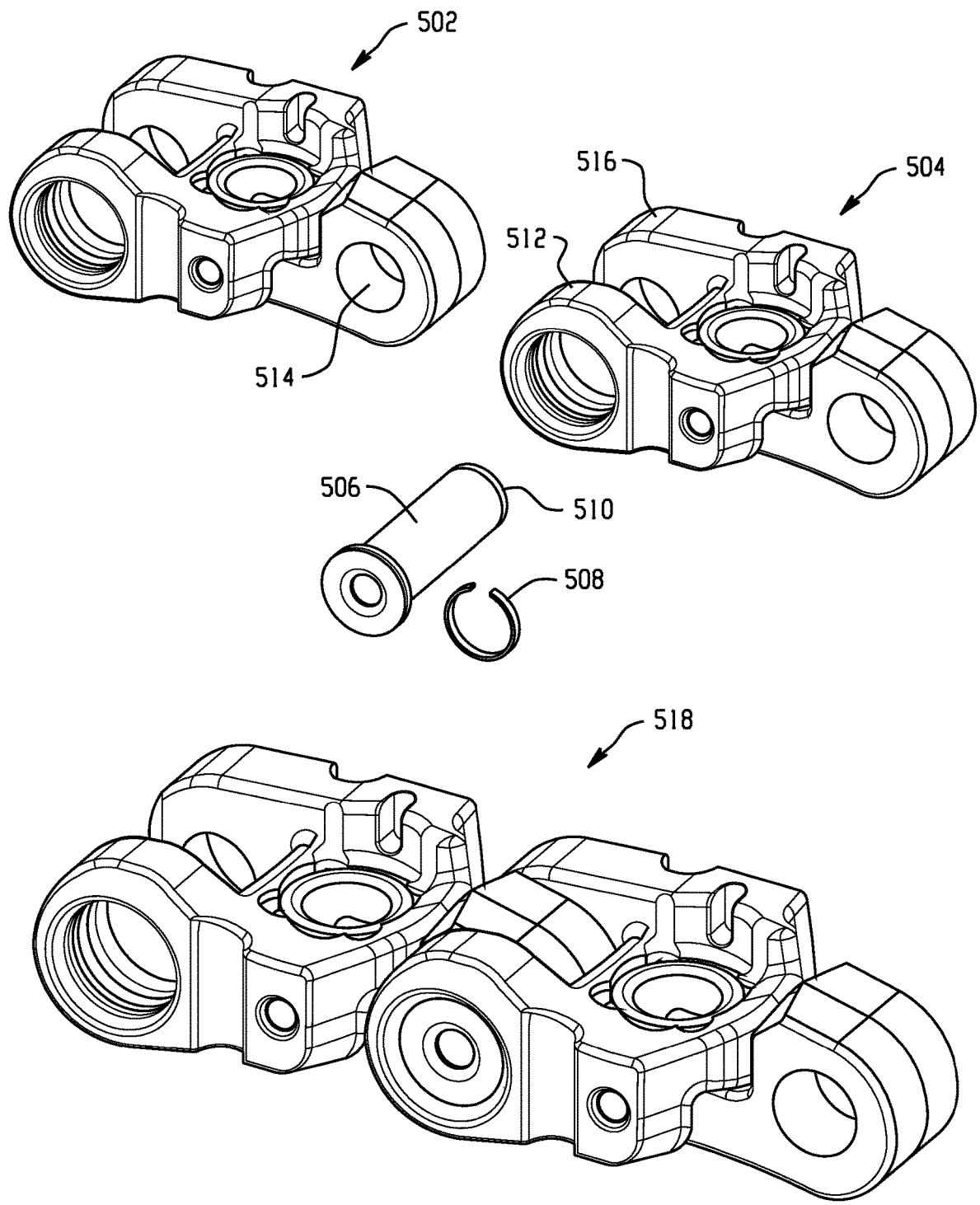
FIG. 5 is a diagram depicting connecting a first conveying unit to a second conveying unit via a bushing having a compressible retaining ring.

FIG. 5 is a diagram depicting connecting a first conveying unit 502 to a second conveying unit 504 via a bushing 506 having a compressible retaining ring 508. The retaining ring 508 is positioned into a groove 510 of the bushing 506 (e.g., a stainless steel bushing). The bushing/retaining ring 506, 508 are configured for installation and removal during connection/disconnection of the first conveying unit 502 and the second conveying unit 504 without disconnecting the retaining ring 508 from the bushing 506. Specifically during installation, the retaining ring 508 in the groove 510 is compressed, the bushing 506 is slid through a first arm 512 of a first link unit of the second conveying unit 504, a hole 514 in the second link unit of the first conveying unit 502, and a second arm 516 of the first link unit of the second conveying unit 504. The retaining ring 508 expands upon exit through the second arm 516. A connected pair of conveying units with bushing installed is depicted at 518.

Figure 6:
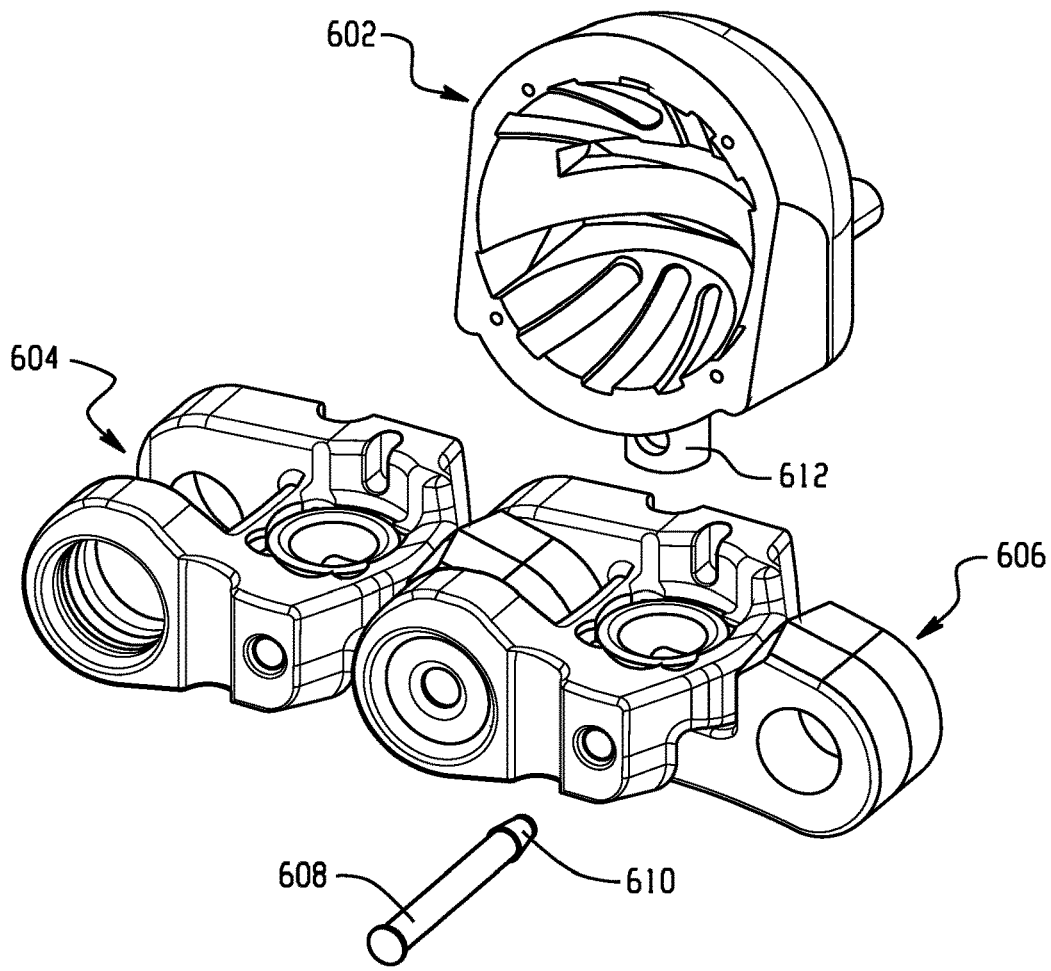
FIG. 6 depicts a cup detachably connected to a first link unit and a second link unit via a pin that includes a compressible portion.
Figure 6:
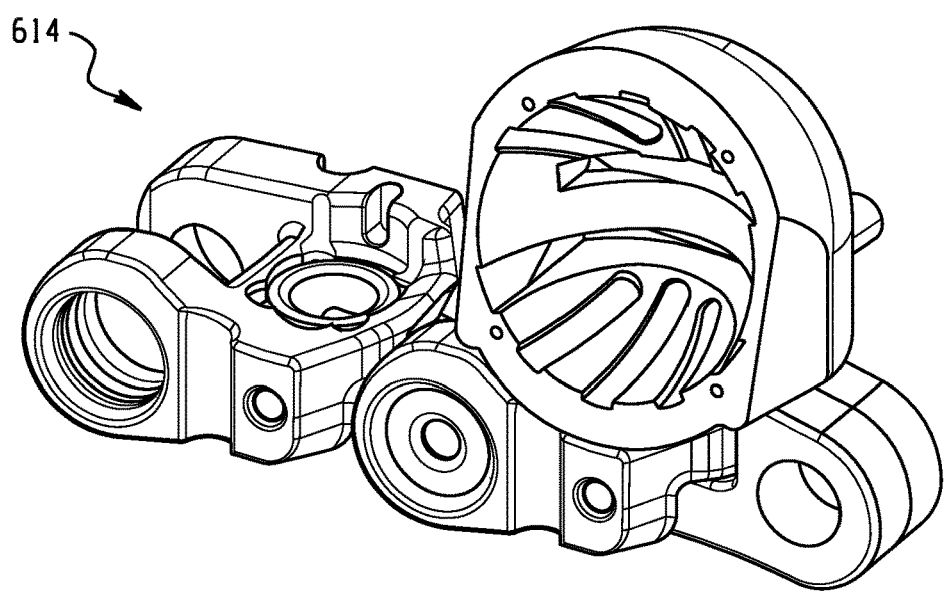

FIG. 6 depicts a cup 602 detachably connected to a first link unit 604 and a second link 606 unit via a pin 608 that includes a compressible portion 610. The pin 608 is positioned through the first link unit 604, the second link unit 606, and a hole in the neck structure 612 of the cup 602. The pin 608 is configured for installation and removal via compression of the compressible portion 610 without disconnection of the compressible portion 610 from the pin 608 (e.g., the compressible portion 610 is screwed or pressed onto the pin 608). The cup 602 may be formed of an inflexible, flexible, or moderately flexible (e.g., flexible but rigid enough to hold a piece of fruit) material (e.g., rubber) molded into a cup shape and a neck portion 612 made from plastic through which the pin (e.g., a stainless steel pin) is threaded or pressed. An installed cup structure is depicted at 614.

Figure 7:
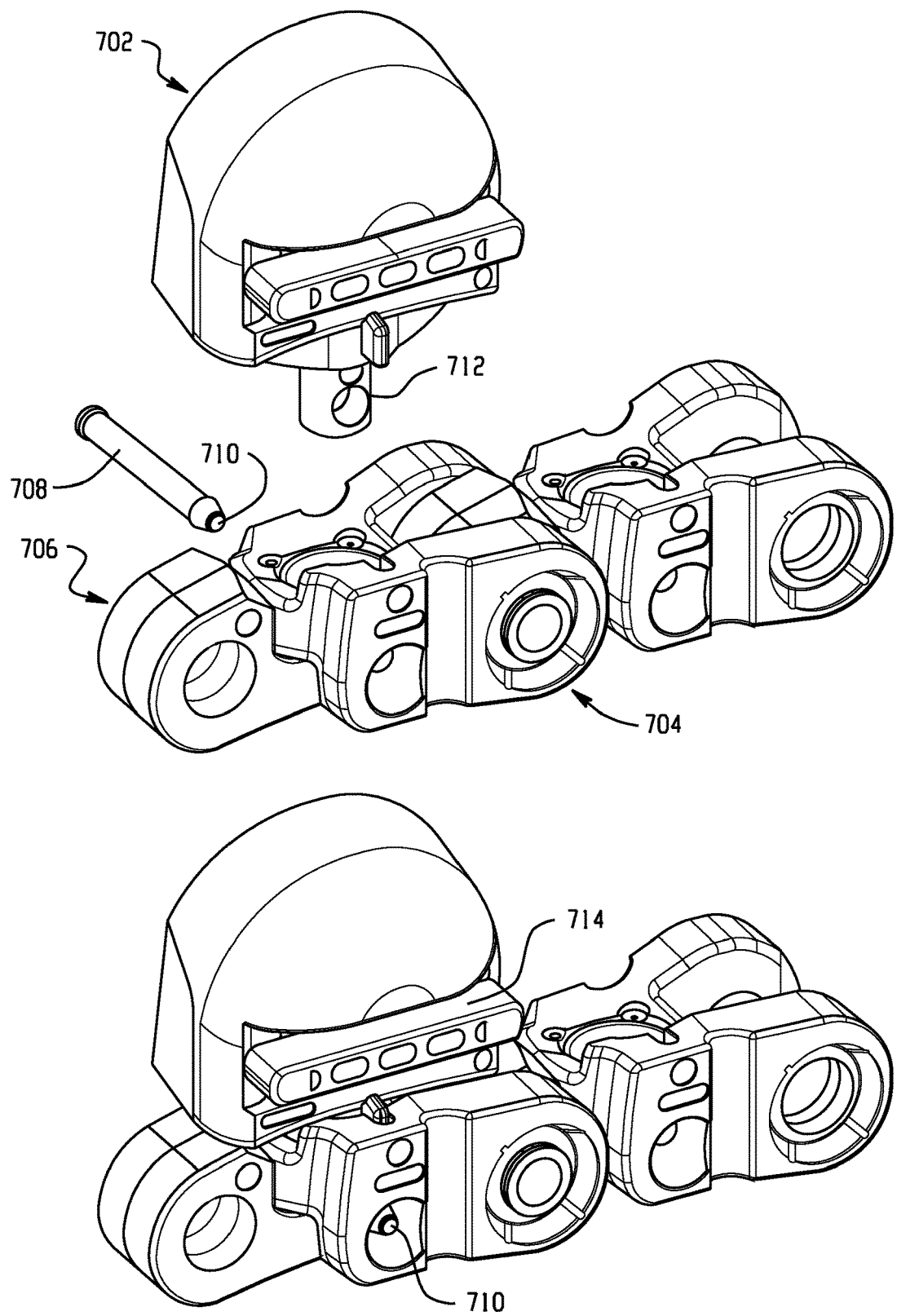
FIG. 7 depicts a back view of connecting the detachably connected cup to the first link unit and the second link unit using a pin.

FIG. 7 depicts a back view of connecting the detachably connected cup 702 to the first link unit 704 and the second link unit 706 using a pin 708. The pin 708 can be removed to release the cup 702 (e.g., a worn or damaged cup 702) by compressing the compressible portion 710 (e.g., a mushroom shaped portion), allowing the pin 708 to be slid out through the first link unit 704, the second link unit 706, and the neck structure 712 of the cup 702, releasing the cup 702 from the first link unit 704 and the second link unit 706. The cup 702 can be detached from the first link unit 704 and the second link unit 706 without disconnecting the first link unit 704 and the second link unit 706 from one another. And in embodiments, the cup 702 can be detached without disconnecting the particular conveying unit from any neighboring conveying units. As depicted at 714, the back of the cup may include a rub-protection portion formed of rubber or plastic or rubber over plastic.

Figure 8:
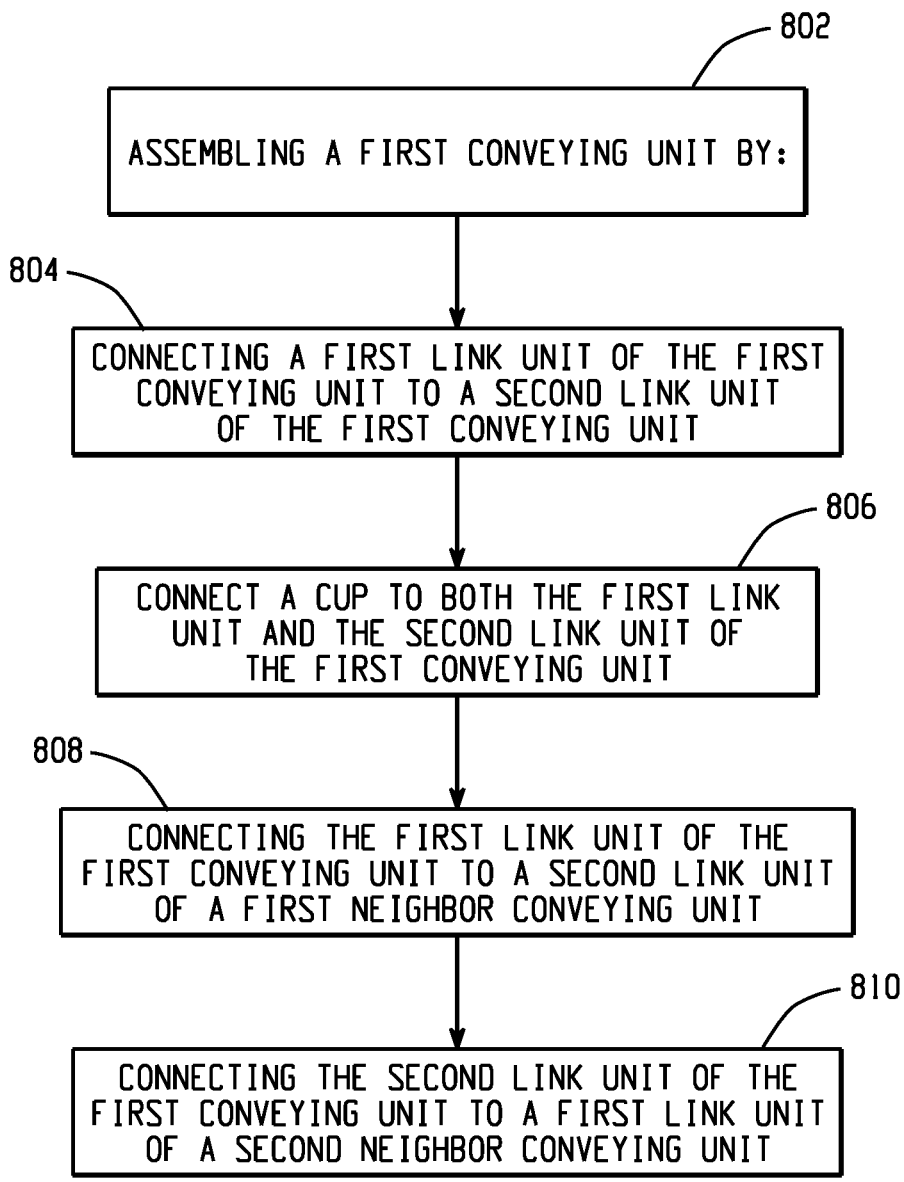
FIG. 8 is a flow diagram depicting a method of forming a chain of conveying units for moving objects along a predetermined path.

FIG. 8 is a flow diagram depicting a method of forming a chain of conveying units for moving objects along a predetermined path. At 802, a first conveying unit is assembled by connecting a first link unit of the first conveying unit to a second link unit of the first conveying unit at 804 and connecting a cup to both the first link unit and the second link unit of the first conveying unit at 806, the cup being detachable from the first link unit and the second link unit without disconnecting the first link unit from the second link unit. At 808, the first link unit of the first conveying unit is connected to a second link unit of a first neighbor conveying unit, and at 810, the second link unit of the first conveying unit is connected to a first link unit of a second neighbor conveying unit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for moving objects along a predetermined path, comprising:
   a plurality of conveying units, each conveying unit being connected to two other conveying units, a particular conveying unit comprising:
      a first link unit configured for connection to a first neighbor conveying unit;
      a second link unit configured for connection to the first link unit, the second link unit further being configured for connection to a first link unit of a second neighbor conveying unit;
      a cup detachably connected to the first link unit and the second link unit, wherein the cup is detachable without disconnecting the first link unit from the second link unit.

2. The apparatus of claim 1, wherein the plurality of conveying units are connected to one another to form a first circuit of conveying units.

3. The apparatus of claim 2, further comprising a second circuit of conveying units, wherein a first cup of the first circuit and a first cup of the second circuit are configured to simultaneously hold a single object.

4. The apparatus of claim 3, wherein the first cup of the first circuit and the first cup of the second circuit are configured to move the object across a blade to cut the object in half, wherein the first cup of the first circuit is thereafter configured to hold a first half of the object and the first cup of the second circuit is thereafter configured to hold a second half of the object.

5. The apparatus of claim 4, wherein the first cup of the first circuit is configured to move the first half of the object to a juicing station and thereafter to release the first half of the object.

6. The apparatus of claim 5, wherein the first cup of the first circuit is configured thereafter to hold another object in cooperation with a cup of the second circuit.

7. The apparatus of claim 1, wherein the first link unit is positioned on a post structure of the second link unit, wherein the first link unit is configured to pivot on the post structure.

8. The apparatus of claim 7, wherein the cup includes a neck structure that is positioned within a hole in the first link unit and the post structure of the second link unit.

9. The apparatus of claim 8, wherein the cup is secured to the first link unit and the second link unit via a pin that includes a compressible portion, wherein the pin is positioned through the first link unit, the neck structure of the cup, and the post structure of the second link unit.

10. The apparatus of claim 9, wherein the pin is configured for installation and removal via compression of the compressible portion without disconnection of the compressible portion from the pin.

11. The apparatus of claim 1, wherein the first link unit includes a connection structure for connection to an external pin that is configured to impart motion on the conveying units.

12. The apparatus of claim 1, wherein the cup comprises a material molded into a cup shape.

13. The apparatus of claim 1, wherein first link unit and the second link unit are connected to each other via a bushing having a compressible retaining ring.

14. The apparatus of claim 13, wherein the bushing/retaining ring are configured for installation and removal without disconnecting the retaining ring from the bushing.

15. The apparatus of claim 1, wherein the cup comprises a rubber portion configured to hold the object, and a plastic support structure for connecting the cup to the second link unit.

16. The apparatus of claim 1, wherein the cup is detachable without disconnecting the particular conveying unit from either of the first neighbor conveying unit or the second neighbor conveying unit.

17. A method of forming a chain of conveying units for moving objects along a predetermined path, comprising:
   assembling a first conveying unit by:
      connecting a first link unit of the first conveying unit to a second link unit of the first conveying unit;
      connecting a cup to both the first link unit and the second link unit of the first conveying unit, the cup being detachable from the first link unit and the second link unit without disconnecting the first link unit from the second link unit;
   connecting the first link unit of the first conveying unit to a second link unit of a first neighbor conveying unit; and
   connecting the second link unit of the first conveying unit to a first link unit of a second neighbor conveying unit.

18. The method of claim 17, wherein connecting the cup comprises:
   compressing a compressible tip of a connecting pin;
   sliding the connecting pin through the first link unit, the second link unit, and the cup;
   allowing the compressible tip of the connecting pin to expand.

19. The method of claim 18, further comprising disconnecting the cup by:
   compressing the compressible tip of the connecting pin;
   removing the pin from the first link unit, the second link unit, and the cup;
   and separating the cup from the first link unit and the second link unit.

20. The method of claim 19, wherein the cup is removed without separation of the compressible tip from the connecting pin.

* * * * *